Dec. 3, 1968   P. G. GIACOBINO   3,413,811
METHOD AND APPARATUS FOR TUNNELING
Filed Feb. 4, 1966   5 Sheets-Sheet 1

INVENTOR.
PASQUALE GIOVANNI GIACOBINO
BY Young & Thompson
ATTYS.

Dec. 3, 1968   P. G. GIACOBINO   3,413,811
METHOD AND APPARATUS FOR TUNNELING
Filed Feb. 4, 1966   5 Sheets-Sheet 4

INVENTOR.
PASQUALE GIOVANNI GIACOBINO
BY Young & Thompson
ATTYS.

INVENTOR.
PASQUALE GIOVANNI GIACOBINO
BY
Young & Thompson
ATTYS.

United States Patent Office 3,413,811
Patented Dec. 3, 1968

3,413,811
METHOD AND APPARATUS FOR TUNNELING
Pasquale Giovanni Giacobino, Piazzale Leonardo da
Vinci 12, Milan, Italy
Filed Feb. 4, 1966, Ser. No. 525,011
Claims priority, application Italy, Feb. 17, 1965,
3,094/65; June 23, 1965, 13,897/65
2 Claims. (Cl. 61—42)

ABSTRACT OF THE DISCLOSURE

Elongated excavations are formed by positioning an open frame against the ground to be excavated, and driving elongated sharpened members into the ground through holes through the frame, in a direction inclined outwardly from the frame, all about the periphery of the frame. The region within the driven members is then excavated; and as the elongated members are inclined outwardly, the spaced thus provided will be large enough for a second frame, which is inserted through the first frame and then the procedure is repeated. At all times, excavation will thus be conducted within a sheath of driven elongated members that prevent collapse of the walls of the excavation.

---

The present invention relates to an improved and quite advantageous system to dig out galleries, wells and the like, in friable or soft ground.

More exactly, the object of the present invention is a method suitable for digging out tunnels, wells or shafts by adopting centering members or frames of metal structural shapes, or metal supporting rings, having predetermined profiles and dimensions, corresponding to those of the tunnel or shaft to be dug out, the positioning of each centering member or ring being immediately followed by the insertion of special steel needles elongated members, distributed along the tunnel walls, and extending through or resting in suitable guides or seats, provided in the above centering member or ring. Said needles are inserted in the ground with a slight predetermined slant relative to the tunnel or shaft axis, so as to allow, inside said reinforcement, after the digging out of the soil limited by same, placement of a second centering member or ring wherein there is repeated the insertion of the needles, and so on.

It is easily understood how said set of needles, disposed even at distances quite close to one another if the ground is quite friable, or at a greater distance if the solidity of the ground can allow it, constitutes already a reinforcement that prevents the ground from collapsing, during the excavation behind the associated centering member and in practice along all the length of the needles.

The needles to be inserted in the centering member and constituting the tunnel reinforcement may have a tubular or a flattened cross-section, or may be smooth or have one or more reinforcing ribs, or any other suitable section.

The above centering member may be provided also with two staggered rows of seats or holes for the passage or the support of the needles, the shape of said holes or seats having to match the cross section of the respective needles, and being either round, for the tubular needles, or flattened, with or without ribs, for the flat-shaped needles, or dove-tailed for open seats, as provided on the outer edge of the centering member or supporting ring, in case of needles having a trapezoidal cross-section.

The advantages of such a system are evident, for anyone expert in this branch of this technical field, because said system permits more quickly, and in a very much more reliable way, the digging out of galleries and the like.

The accompanying drawings show diagrammatically and by way of example, some embodiments of the system according to the above invention and precisely:

Figure 1:
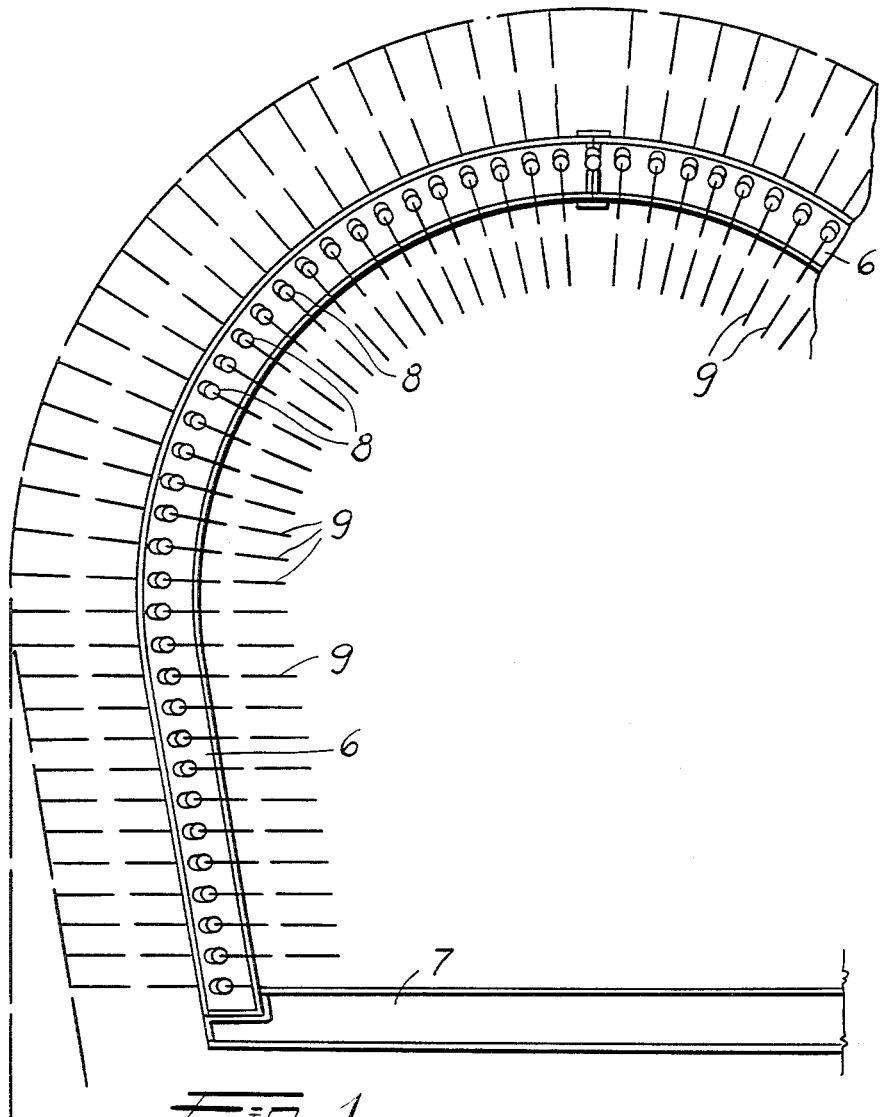
FIG. 1 shows in a front view, the most important part of a centering member provided, according to the invention, with sleeve-guides for the needles and wherein are shown also the axes of the different needles to be received in the same.

The main elements provided for realizing the system which is the object of the invention, are the centering members one of which is shown by 6 in FIG. 1. It is formed of a metallic profile, which in the case of the drawings, is a profile double T-shaped, said centering members being previously built, in the desired shapes and dimensions, and they are closed at their bottom by a beam 7, made of profiled iron. Said centering members, along their extent, corresponding to the side and upper walls of the gallery, are provided with holes, in the are fixed sleeves such as those shown by 8 in FIG. 1, for the passage of needles of strong steel, preferably tubular needles, said sleeves having such an inclination in respect of the centering plane, that the needles passing and being guided by them, are driven into the ground with an inclination for instance of 11° in respect of the longitudinal axis of the gallery, and in the expansion direction in respect of the outline of the centering member itself.

The position of said sleeve-guides will be staggered in the successive centering members, for reasons which will be explained later.

Figure 2:
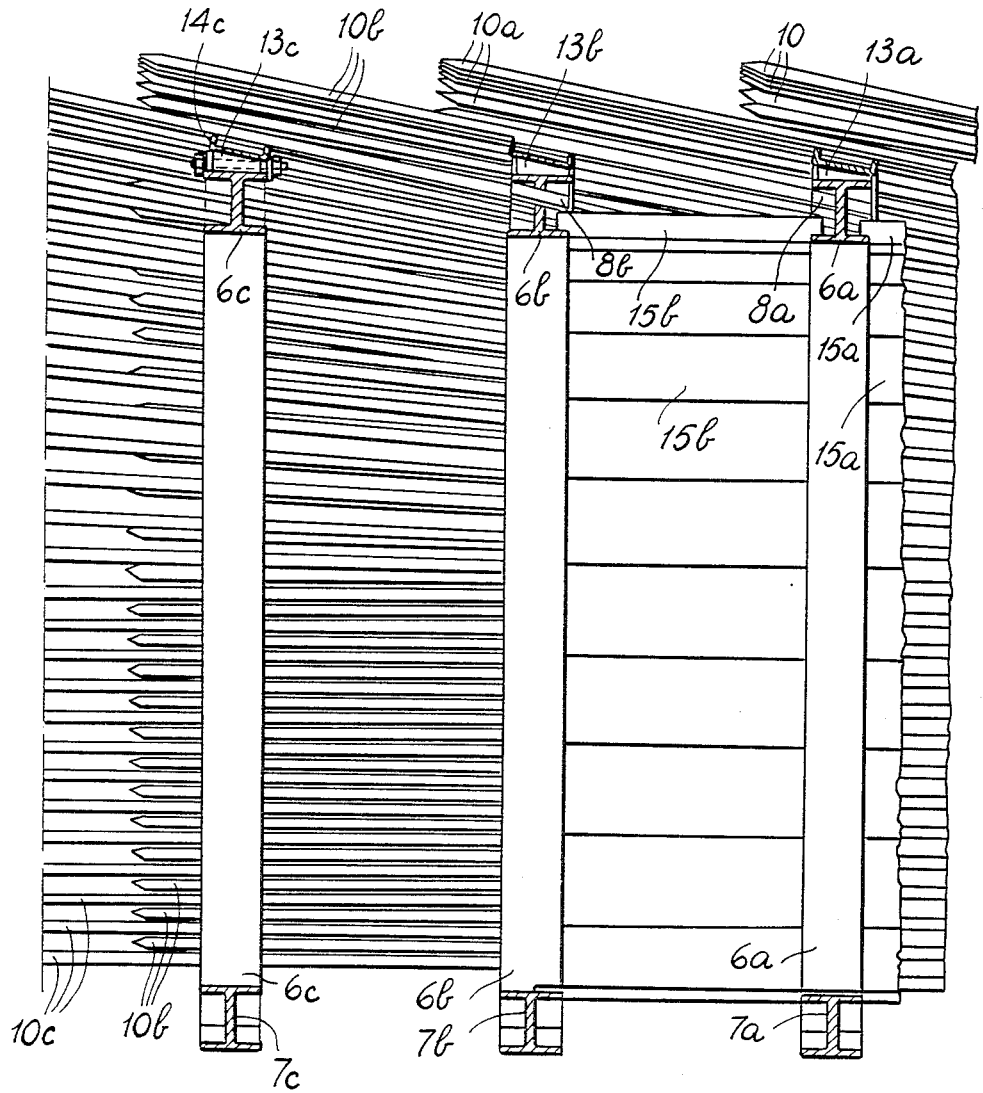
FIG. 2 is a side view of a section of gallery which is being built, obtained according to the method of the present invention, the centering members being sectioned in an axial plane.
Figure 3:
FIG. 3 is a view from the top of different centering members, from those shown in FIG. 1, and wherein there are mounted different needles inclined as provided by the invention.
Figure 4:
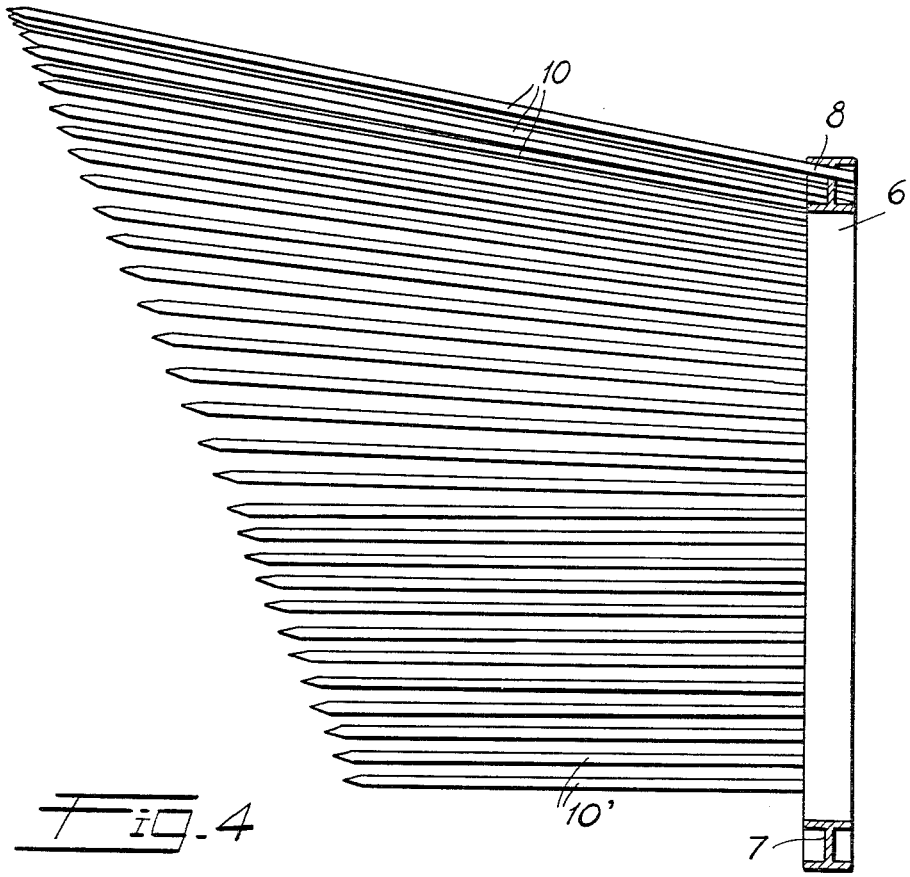
FIG. 4 is a view similar to FIG. 2 of a modified embodiment of the invention.

Further main elements for realizing the excavation system which is the object of the present invention, are the needles or drills shown by 10, 10a, 10b etc. in FIGS. 2, 3 and 4, said needles being each one formed by a suitable special steel. They are preferably tubular, with a pointed and closed end, while their cylindrical walls are provided with holes such as those shown by 12 in FIG. 5, and inclined in respect of the axis of the needle and turned in a direction away from the forward direction of the needle itself driving into the ground.

It is thereby understood that upon feeding into these tubular needles 10, a fluid under pressure, as for instance liquid cement, bentonite mud or other product appropriate for the purpose, said liquid will go out under pressure from holes 12 of each needle, sinking into the surrounding ground, consolidating it and making nearly impossible any landslide.

The excavation of a gallery according to the present invention is realized in the following way: at the entrance of the gallery there is applied a centering member such as that shown in FIG. 1, fixing it in whatsoever suitable way. Then by a pressure or rotation system, there are threaded in any of the sleeves 8, with which the centering member is provided, a needle such as those shown by 10, 10a, 10b which will drive into the ground, in the way as shown by FIGS. 2, 3 and 4.

After said threading of the needles, the ground will be dug out behind the centering member, and within the profile defined by the needles 10, driven into the ground. Said digging out is effected along a portion corresponding to the distance at which the different centering members must be disposed, then a second centering member is applied, for instance the one shown by 6a of FIG. 2, and in this case the distance between the two centering members will be appreciably smaller than the length of the needles 10, 10a . . . and in any case it cannot exceed said length, and the above said centering member will be locked in the exact position by means of wedges such as those shown at 13a, 13b and 13c, said wedges closing the centering member against the needles adjacent to same, for instance by means of bolts as the one shown by 14c in FIG. 2.

Next, further needles such as those shown by 10b will be threaded in the associated sleeve-guides 8a and driven into the ground lying behind.

Later on, a further portion of gallery is dug out as far as to the required distance for applying a further centering member, 6b, and in the same way all along the length of the gallery.

Of course, the dimensions of the needles and the spacing thereof, as well as the spacing of the centering members, may vary according to the type of ground where the gallery has to be dug, but in general the length of the needles is about 2.5 meters and the distance between the adjacent axes 9 (FIG. 1) of the adjacent needles, will be usually about 10 or 15 cms. The distance between adjacent centering members can vary from 1 to 2 meters, according to the ground; but all said data are given only by way of example, and of course their value can vary according to requirements.

Figure 5:
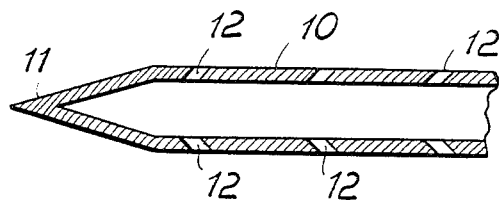
FIG. 5 shows diagrammatically the detail of the tip of one of the tubular needles.

Even the diameter of the single needles can change according to the particular type of ground, and the needles themselves can be both massive or more frequently tubular as shown in FIG. 5, and the tip 11 of the same will be pointed and treated in such a way as to present a suitable hardness, because it is this tip which must penetrate into the ground. The holes 12 provided in the cylindrical walls of these needles 10, will be turned as shown in the drawing, in order to avoid becoming filled with ground, while the needle is going forward in the same. They are quite useful to effect injections of liquid cement or bentonite mud or the like, in the ground in order to consolidate same and to form a kind of block between the ground and the reinforcement constituted by the needles and by the centering members, in the building gallery. In such a way landslides will be impossible, in spite of the friable and soft quality of the ground.

FIGS. 2 and 3, show the arrangement of the centering members and of the associated reinforcement needles, seen respectively from one side and from the top, and we can see how the sets of needles 10, 10a 10b and 10c are at least partially superimposed on each other, and they appear to constitute two or even three superimposed layers, assuring a perfect reinforcement and a remarkable consolidation even for quite friable ground.

FIG. 4 shows a particular case, that is the case in which the needles 10, threaded in the sleeve-guides 8 of a centering member 6, have not the same length, along the whole perimeter of the centering member, but they have lengths gradually decreasing from the vault to the lower end of the side walls of the gallery, because in this case, the type of ground allows it, that is the ground does not require so strong a reinforcement, for the lower zone of the gallery itself, and the difference in the length between the needles of the top of the gallery, shown by 10 in FIG. 4, and the lower needles 10', will depend on the landslide angle of that particular ground. In this case it is possible to realize a saving of the material constituting the needles as well as a saving in the work, because driving in a shorter needle is easier and less expensive, than driving in a longer one.

Of course the work will be completed in a known or preferred way, according to the purpose of the gallery and to its use; in particular the space between two superimposed layers of needles, can be filled in, by loose material or by concrete, and the walls themselves can be covered by metal plates, or concrete layers, or by any preferred or suitable means.

In the case in which it is required to excavate wells by the above system, there will be used centering members or reinforcements of circular, square, or rectangular profile or the like, and the needles or preferably the associated sleeve-guides will be distributed uniformly along the perimeter of the centering member and the driving in of the same into the ground through the guides of the respective centering members, will be carried out in a similar way, as followed for digging out of galleries, that is the needles can be driven in by pressure or by rotation.

In FIG. 2 showing an inner side of a gallery, built according to the present invention, there are clearly seen the covering plates of the gallery wall, shown respectively by 15a and 15b.

Figures 7, 8, 10:
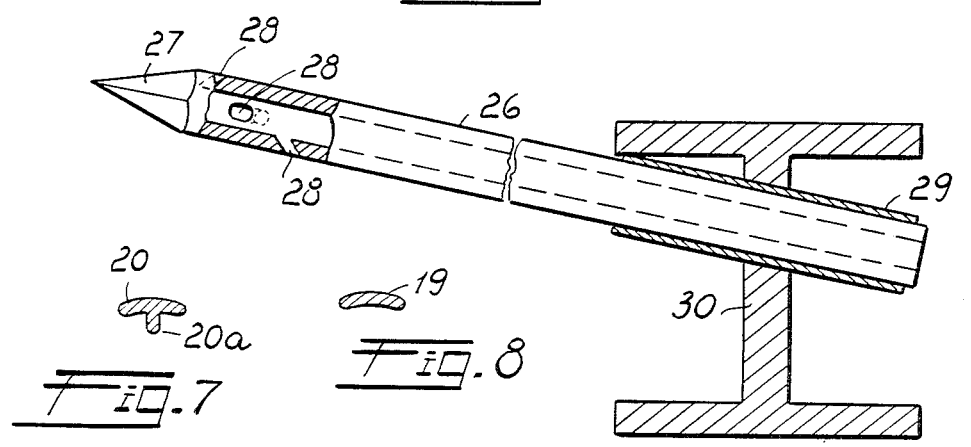
FIGS. 7, 8 and 9 show some shapes of needle cross-sections.
FIG. 10 shows, on a larger scale than the preceding ones, the sectional view of a centering member, in correspondance with the axial plan of a needle extending through same, the centering member being provided with a guiding sleeve.

In FIG. 7 there is illustrated the cross-section of a flat-shaped needle 20, provided with a shart-pointed tip and with a rib 20a perpendicular to the flat portion of the needle itself.

This type of needle, flat, with a slightly curved back and a rib 20a, has proved to be espectially suited for lose and crumbly soils not containing pebbles, or containing them only in a very limited amount, a soil however wherein strong thrust must be used for penetration.

Figure 6:
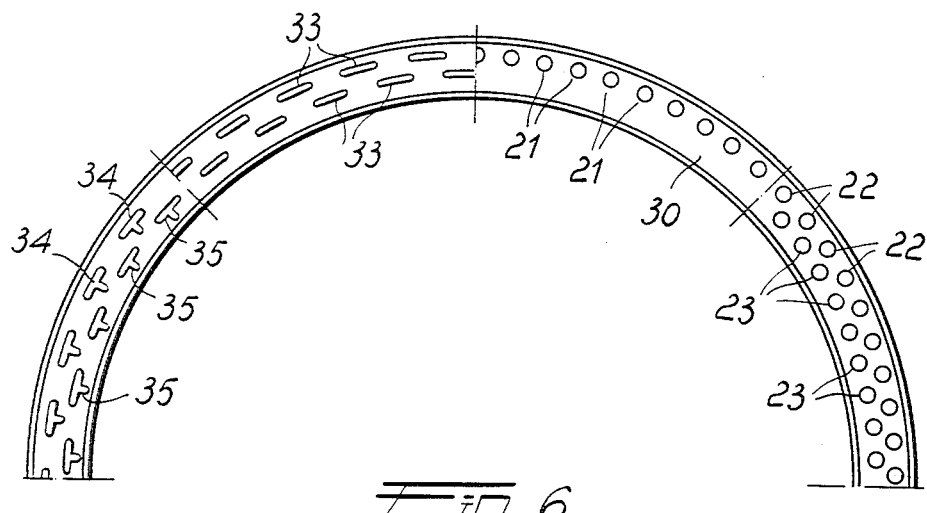
FIG. 6 shows schematically a centering member divided in sections, in each of which there are provided different holes, illustrating different types of holes that the centering members themselves can have.

In the first left hand section of FIG. 6, one sees how in the centering member there have been provided two rows of holes, 34 and 35, of a shape matching that of the cross-section of needles as in FIG. 7 and having a remarkable resistance to the soil thrust, and that have a cost cheaper than that of tubular needles.

Figures 9, 11:
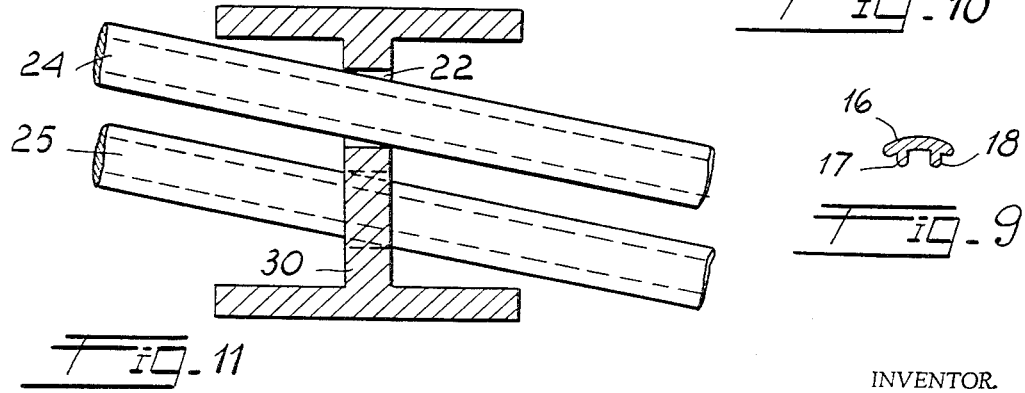
FIG. 11 shows the sectional view of a centering member similar to the preceding one, wherein are inserted two sets of tubular needles.

FIG. 9 illustrates the cross-section of a flattened needle 16, provided with two ribs, 17 and 18, which needle is particularly suitable for soils of the type previously cited and exerting a higher thrust.

FIG. 8 shows the cross-section, of a flat needle form, without ribs, which needles too are suitable for loose and crumbly soils.

In the second section of the centering member of FIG. 6 there are provided holes 33, they too in two staggered rows, for inserting therethrough flat needles as shown in FIG. 8.

The next section of the centering member is provided with a single row of round holes for inserting tubular needles as shown in FIG. 10 and FIG. 11, while, in the next section, the centering member has two rows of round holes, 22 and 23, staggered among themselves, for insertion of two sets of tubular needles, as shown at 24 and 25 in FIG. 11.

As already mentioned above, the use of tubular needles is particularly suitable for loose or crumbly soils containing many pebbles.

In FIG. 10 there is shown in detail also a tubular needle, 26, which is provided with a closed pyramidal tip 27, and provided, close to it, with holes 28 for the passage therethrough of a suspension or mortar of cement or bentonite, for the consolidation of the soil around the reinforcement constituted by said needles 26.

In said figure there can also be seen the sleeve 29, with which all the holes of a centering member 10 or 30 can be provided and adapted to constitute sturdy guides for needles such as 26.

Of course to insert in the soil flat needles such as those of FIGS. 7, 8 and 9, there shall be used a percussion method, while in the instance of tubular needles, it might be preferable to use a rotary method.

According to another embodiment of the invention the seats for guiding and supporting the needles may be open and provided on the outer edge of the centering or supporting ring and have for instance, a dove-tailed shape.

Of course the materials constituting the single elements of the device required for realizing the system which is the object of the present invention, as above described and shown by the drawings, as well as the constructional details thereof, and also the different systems for realizing the actual excavation, can vary according to need, without departing from the scope of the invention.

What I claim is:

1. A method of constructing elongated excavations, comprising positioning a first open frame adjacent ground to be excavated, forcing a first plurality of elongated members into the ground in such a position to encompass the ground to be excavated with said members supported by the frame and inclined outwardly in the direction of excavation, excavating the ground encompassed by said elongated members, inserting a further open frame through said first open frame into the space encompassed by said first elongated members, repeating the placement of further elongated members and the excavation of ground within said further elongated members, and forcing a consolidating liquid through said elongated members and out through openings through said elongated members into the ground thereby to consolidate the ground adjacent said elongated members.

2. Structure for lining an elongated excavation, comprising a plurality of open frames spaced apart lengthwise of the excavation, and a plurality of elongated members supported adjacent one end by one said frame and having their other ends disposed outside of the adjacent open frame so that said elongated members are inclined outwardly of the excavation in a direction from said one frame toward said adjacent frame, said elongated members having internal passageways extending lengthwise thereof and terminating in openings through the side of said elongated members for the distribution of consolidating fluid into the ground adjacent said elongated members.

References Cited

UNITED STATES PATENTS

| | | | |
|---|---|---|---|
| 1,255,207 | 2/1918 | Morgan | 61—45 |
| 3,280,572 | 10/1966 | Hatton | 61—85 |

OTHER REFERENCES

German printed application to Esser, DAS 1,091,059, 10/1960.

JACOB SHAPIRO, *Primary Examiner.*